United States Patent
Hills

[19]
[11] Patent Number: 6,068,312
[45] Date of Patent: May 30, 2000

[54] BARBECUE TOOL

[76] Inventor: Hiram James Hills, 343 Bailey Ave., South Haven, Mich. 49090

[21] Appl. No.: 09/285,591

[22] Filed: Apr. 2, 1999

Related U.S. Application Data

[60] Provisional application No. 60/094,175, Jul. 27, 1998.

[51] Int. Cl.$^7$ .................................................. A47J 43/28
[52] U.S. Cl. .......................................... 294/7; D7/688
[58] Field of Search .................... 294/7, 8, 9, 55.5; 15/236.08; 30/129, 137, 322; D7/653, 688

[56] References Cited

U.S. PATENT DOCUMENTS

| | | |
|---|---|---|
| D. 29,621 | 11/1898 | Pitts . |
| D. 109,133 | 4/1938 | Galleazzi .................................. 30/322 |
| D. 169,412 | 4/1953 | Bordelon .................................. 30/322 |
| D. 198,097 | 4/1964 | Foster . |
| 512,162 | 1/1894 | Cuddy ........................................ 294/7 |
| 888,927 | 5/1908 | Quinsey .................................. 294/55.5 |
| 898,926 | 9/1908 | Reyer ........................................ 30/322 |
| 1,441,194 | 1/1923 | Forssberg . |
| 2,271,812 | 2/1942 | Clemings . |
| 2,697,627 | 12/1954 | La Fond . |
| 2,747,911 | 5/1956 | Kuever . |
| 2,841,869 | 7/1958 | Levine ........................................ 30/322 |
| 2,994,553 | 8/1961 | Banton ........................................ 294/7 |
| 3,213,779 | 10/1965 | First . |
| 4,711,029 | 12/1987 | Somerset .................................... 294/7 |
| 4,848,816 | 7/1989 | Anderson . |
| 5,175,933 | 1/1993 | Shepherd . |
| 5,228,201 | 7/1993 | Atkins ........................................ 30/322 |
| 5,386,633 | 2/1995 | Kanno ........................................ 294/7 |

FOREIGN PATENT DOCUMENTS

| | | |
|---|---|---|
| 1139518 | 7/1957 | France ........................................ 294/7 |
| 122897 | 10/1948 | Sweden ...................................... 294/7 |
| 10905 | 3/1898 | United Kingdom ...................... 30/137 |

*Primary Examiner*—Dean J. Kramer
*Attorney, Agent, or Firm*—Price, Heneveld, Cooper, DeWitt & Litton

[57] ABSTRACT

A grill spatula includes a spatula head having a distal food handling portion and a proximal shank portion. The food handling portion defines a plurality of spaced apart fingers and a continuous plate section located between the fingers and the proximal shank portion. The fingers are sized and spaced apart so that they can be inserted between rods of a grill. The entire upper side of the food handling portion of the spatula head is flat. A heat resistant handle is fixed to the shank portion of the spatula head and extends proximally away from the shank portion. The arrangement allows the spatula head to be more easily slid under a food item and facilitates easy removal of food items from a grill without damaging the food item.

8 Claims, 1 Drawing Sheet

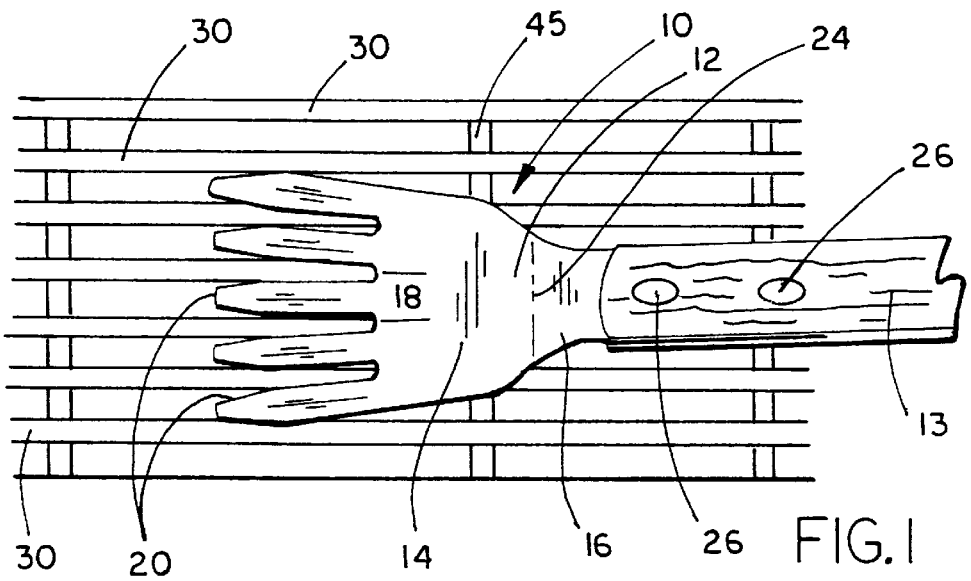
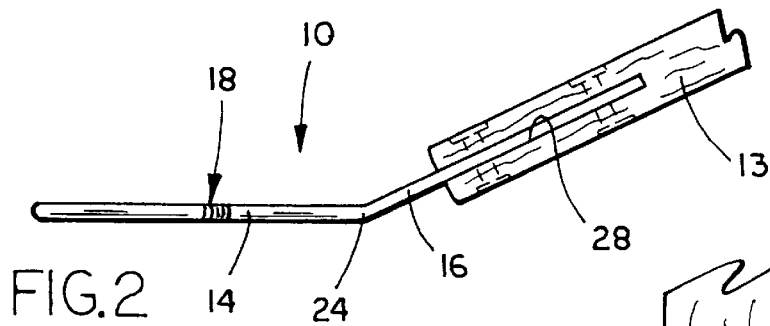
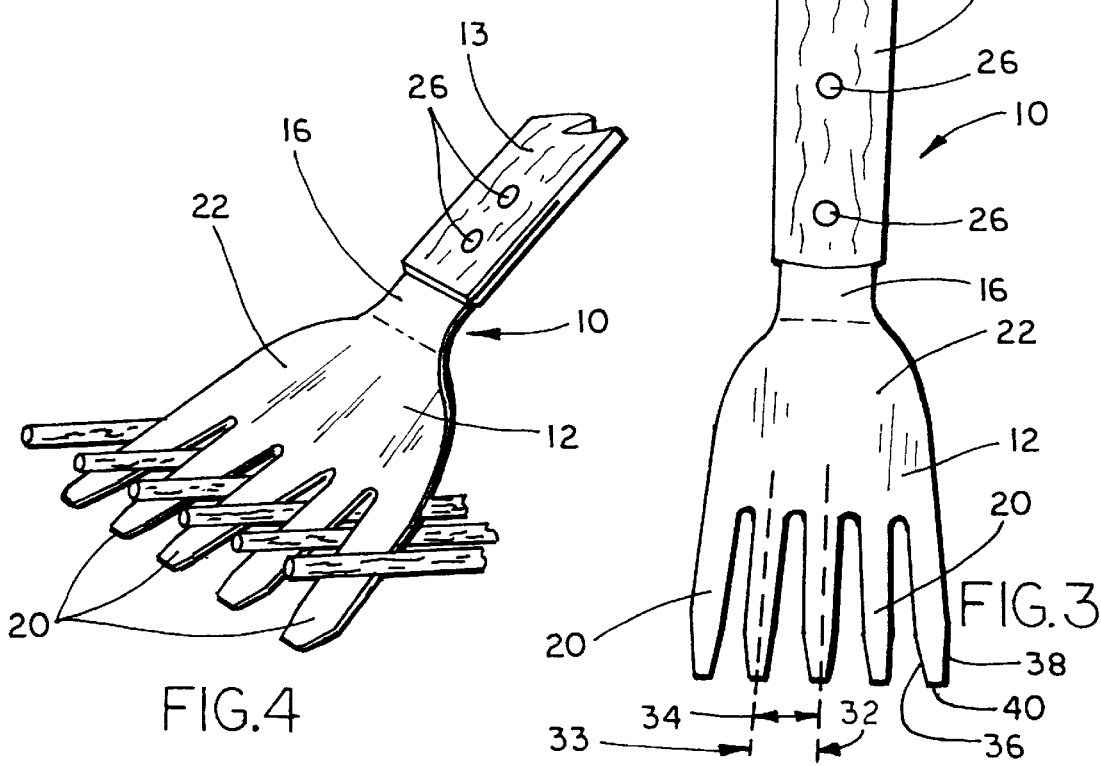

BARBECUE TOOL

Applicant hereby claims the priority benefits under the provisions of 35 U.S.C. §119, basing said claim of priority on U.S. Provisional Patent Application No. 60/094,175, filed Jul. 27, 1998.

FIELD OF THE INVENTION

This invention relates to a barbecue tool, and more specifically to a grill spatula which facilitates handling of foods cooked on a grill.

BACKGROUND OF THE INVENTION

It has long been recognized that one of the problems associated with cooking or grilling foods on a grill comprised of uniformly spaced apart rods is that the foods often tend to stick to the rods. This is especially a problem with foods, such as hamburger, which tend to reform during cooking so that a substantial portion of the upper surface of the rods beneath the cooking food is surrounded by the food. Also, as a result, the portions of the underside of the food which are not supported by the rods are generally located in the space between the rods when it is time to turn the food or remove the food from the grill. Because of the tendency for foods, such as hamburger, to stick to and conform to the upper surfaces of the rods, it is generally very difficult, if not impossible, to remove the food item from the grill with a flat spatula having a straight distal edge without tearing the food item and significantly compromising the integrity of the food item.

In order to reduce tearing and disintegration of food items when they are being removed from a wire rod grill, various spatulas or food handling devices have been developed which have fingers, tines or projections which are spaced apart to fit into the space between the rods of the grill, so that the fingers can be used to engage the underside of the food item and lift the food item from the grill. One such device is disclosed in U.S. Pat. No. 3,213,779. However, the fingers of this device are bent upwardly away from the rearward continuous plate section of the spatula head. This has the disadvantage of forcing the food item to be bent as it is being removed from the grill, hence stressing the food item in such manner as to compromise its integrity. Another disadvantage is that because the food item must slide upwardly along the rearward plate section of the spatula head, there is greater resistance against sliding the spatula under the food item than would be encountered if the fingers were not bent with respect to the plate section of the spatula head. Also, the rivets used to attach the plate section of the spatula head to the handle present protuberances which also increase resistance against sliding the spatula head under a food item cooked on a grill.

U.S. Pat. No. 2,747,911 discloses a food handling and scrapping tool for use with grills which includes a plurality of notches and projections defined between the notches, with the notches and projections being configured so that the projections can extend into the area between the rods of a grill to enable the spatula head to be worked under the food item and slide the food back onto the spatula head. However, the projections are not sufficiently long to allow any substantial lifting of the food item from the grill, especially when the upper surface of the spatula is tilted into a nearly horizontal position to allow the spatula head to be more easily slid under the food item, as opposed to a more inclined orientation which would tend to push on an edge of the food item and cause tearing and loss of integrity of the food item.

Also, as with the spatula of U.S. Pat. No. 3,213,779, the food handling and scrapping tool described in U.S. Pat. No. 2,747,911 has the handle extension riveted directly to the spatula head.

Accordingly, there remains a need for an improved grill spatula for removing a food items, especially hamburgers, from a grill without tearing and compromising the integrity of the food items, and which allows the spatula head to be slid more easily under the food item and lifted from the grill.

SUMMARY OF THE INVENTION

The invention provides an improved grill spatula of the type having fingers which are spaced and splayed apart so that they can be positioned between the rods of a grill to allow engagement between the fingers and the underside of a food item and loosening of the food item from the grill. More specifically, the grill spatula has been designed with a spatula head which allows the spatula head to be more easily slid under a food item to make it easier to remove food items seared to the grill, while reducing tearing and disintegration of the food item.

The grill spatula includes a spatula head having a distal food handling portion and a proximal shank portion. The food handling portion defines a plurality of spaced apart fingers and a continuous plate section located between the fingers and the proximal shank portion. The entire upper side of the food handling portion is flat. A heat resistant handle is fixed to the shank portion and extends proximally away from the shank portion.

BRIEF DESCRIPTION OF THE DRAWINGS

FIG. 1 is top plan view of the grill spatula of this invention, in combination with a grill, with the spacing between the fingers of the spatula head of the grill spatula conforming to the spacing between the rods of the grill so that the fingers of the spatula head can be inserted only part of the way between the rods of the grill;

FIG. 2 is a side view of the spatula shown in FIG. 1;

FIG. 3 is another top plan view of the spatula of FIG. 1 which illustrates the angle by which the fingers of the spatula head are splayed with respect to each other; and FIG. 4 is a perspective view showing the fingers of the spatula head of the grill spatula positioned between the rods of a grill.

DESCRIPTION OF THE PREFERRED EMBODIMENTS

A grill spatula 10 is shown in each of FIGS. 1–4. The grill spatula includes a spatula head 12 and a heat resistant handle portion 13 fixed to spatula head 12.

Spatula head 12 includes a distal food handling portion 14 and a proximal shank portion 16. As best illustrated in FIG. 2, the entire upper side 18 of food handling portion 14 is flat. Food handling portion 14 defines a plurality of spaced apart and splayed out fingers 20 and a continuous plate section 22, which is located between fingers 20 and shank portion 16. Plate section 22 is continuous in the sense that it does not have any openings or slots cut into it.

The entire upper side 18 of food handling portion 14 is flat in the sense that it has a smooth, even surface which lies in a single plane. In other words, fingers 20 are not angled or bent from the plane defined by continuous plate section 22.

Shank portion 16 is bent upwardly with respect to food handling portion 14 at bend 24. Bend 24 generally serves as a demarcation between food handling portion 14 and shank portion 16 of spatula head 12.

Heat resistant handle 13 is fixed to shank portion 16 and extends proximally away from shank portion 16. In the illustrated embodiment, heat resistant handle 13 is fixed to shank portion 16 with rivet fasteners 26. Shank portion 16 is received in a slot 28 defined by handle 13. Opposite sides of shank portion 16 engage internal sides of slot 28, i.e., facing sides within the interior of handle 13.

As can be seen by reference to FIGS. 1 and 4, fingers 20 are sized and spaced apart so that they can be inserted between the parallel rods 30 of a grill. This allows fingers 20 to be positioned beneath an item of food so that the food can be loosened from the grill from underneath and above as grill spatula 10 is slid in a distal direction along a path parallel to the longitudinal direction of rods 30.

As best illustrated in FIG. 3, fingers 20 are all of the same length. However, fingers 20 are splayed apart so that the distal ends of any two adjacent fingers 20 diverge away from each other. More specifically, dashed lines 32, 33 which are centered along the lengths of adjacent fingers 20 converge at a point located rearwardly of shank portion 16 to define an angle 34. Angle 34 is preferably less than 5°, and more preferably less than about 1 or 2°. Each of the adjacent pairs of fingers are splayed apart by a similar, or the same, angle. In the illustrated embodiment having five fingers 20, the middle finger is in a straight line with the length of handle 13, whereas each of the fingers adjacent the center finger are splayed outwardly away from the center finger by angle 34. The two outer most fingers are splayed outwardly away from the center finger by an angle which is twice angle 34, the result being that any adjacent pair of fingers 20 are splayed apart by an angle 34. Because fingers 20 are splayed outwardly, fingers 20 can only be inserted part way into the space between rods 30, with the remaining portion of each of fingers 20 being positioned above the cooking surface defined by rods 30. As a result, lifting and prying is unnecessary. Removal of a food item from the grill defined by rods 30 only requires a straight movement parallel with the longitudinal direction of rods 30 to raise a food item up onto fingers 20 and plate section 22 without damaging the food item. The pressure on the food is directed toward the center of the tool because of the angle of the edges of the fingers. This prevents breaking of the food that can occur if the fingers were straight or only tapered.

Fingers 20 comprise from about 40 to about 60% of the length of food handling portion 14 of spatula head 12, and more preferably about 50%. This provides a substantial surface area which can engage the underside of a food item at the space between rods of a grill, and a substantial continuous area for supporting a food item.

As can be seen by reference to FIGS. 1, 3 and 4, fingers 20 generally have a uniform width along the entire length of fingers 20, except at the distal ends wherein the fingers are tapered. In particular, as can be seen by reference to FIG. 3, the terminal portions of fingers 20 have straight edges 36 and 38 which converge toward a straight end 40. The tapered terminal portions of fingers 20 serve to guide fingers 20 into the space between rods 30, and make it easier to position fingers 20 beneath a food item which is to be removed from a grill defined by rods 30.

Bend 24 allows spatula head 12 to be positioned nearly parallel with the cooking surface of a grill defined by rods 30 while allowing handle 13, and hence the hand of a person using grill spatula 10 to be positioned at a sufficient distance from the cooking surface to prevent exposure of the hand to excessively high temperatures. It also permits fingers 20 to pass above the cross rods 45 that support the surface rods of the grill.

Although spatula head 12 can be made from a variety of materials, it is preferably made of steel, and more preferably stainless steel, as stainless steel is more resistant to deterioration such as rusting. Handle 13 can be made of a variety of different materials having a thermal conductivity which is significantly less than that of most metals. Suitable heat resistant materials include plastics and wood, with wood being preferred.

One significant advantage with connecting handle 13 to shank 16 in the manner illustrated is that the smooth upper surface 18 of food handling portion 14 of spatula head 12 is smooth and uninterrupted by fasteners. Another advantage is that the handle can be gripped very near to spatula head 12 if desired.

It will become apparent to those skilled in the art at various modifications to the preferred embodiment of the invention can be made without departing from the spirit or scope of the invention as defined by the appended claims.

The embodiments of the invention in which an exclusive property or privilege is claimed are defined as follows:

1. A grill spatula comprising:
   a spatula head having a distal food handling portion and a proximal shank portion, the food handling portion defining a plurality of spaced apart fingers and a continuous plate section located between the fingers and the proximal shank portion, the entire upper side of the food handling portion being flat, the spatula head having at least three fingers, including a center finger and at least one finger on each side of the center finger which is splayed outwardly away from the center finger; and
   a heat resistant handle fixed to the shank portion and extending proximally away from the shank portion.

2. The grill spatula of claim 1, wherein the handle and shank portion of the spatula head are riveted together.

3. The grill spatula of claim 2, wherein the shank portion of the spatula head is received in a slot defined by the handle.

4. The grill spatula of claim 3, wherein opposite sides of the shank portion engage internal sides of the slot.

5. The grill spatula of claim 1, wherein the fingers include distal ends which are tapered.

6. The grill spatula of claim 1 in which the heat resistant handle is wood.

7. The grill spatula of claim 1, wherein the spatula head is stainless steel.

8. The grill spatula of claim 1, wherein the fingers comprise from about 40% to about 60% of the length of the food handling portion of the spatula head.

* * * * *